United States Patent [19]
DeWachter

[11] Patent Number: 5,567,306
[45] Date of Patent: Oct. 22, 1996

[54] LUBRICANT FILTERING SYSTEM

[75] Inventor: Gary DeWachter, Greenville, S.C.

[73] Assignee: Reliance Electric Industrial Co., Greenville, S.C.

[21] Appl. No.: 410,407

[22] Filed: Mar. 27, 1995

Related U.S. Application Data

[63] Continuation of Ser. No. 52,064, Apr. 22, 1993, abandoned.

[51] Int. Cl.$^6$ ................................................ B01D 35/02
[52] U.S. Cl. ..................... 210/168; 210/416.5; 210/440; 184/6.24; 74/467; 384/473
[58] Field of Search .................................. 210/168, 171, 210/232, 416.5, 440; 184/6.24; 74/467; 384/473

[56] References Cited

U.S. PATENT DOCUMENTS

| | | | |
|---|---|---|---|
| 3,502,176 | 3/1970 | Terry | 210/168 |
| 3,743,096 | 7/1973 | Harvey, Jr. et al. | 210/232 |
| 4,878,536 | 11/1989 | Stenlund | 210/186 |
| 5,150,975 | 9/1992 | Major et al. | 384/465 |

FOREIGN PATENT DOCUMENTS

| | | | |
|---|---|---|---|
| 45864 | 2/1982 | European Pat. Off. | 74/467 |
| 2202010 | 9/1988 | United Kingdom | 74/467 |

Primary Examiner—Matthew O. Savage
Attorney, Agent, or Firm—Dority & Manning

[57] ABSTRACT

A lubrication system for a speed reducer, gear box, or the like. It may also be utilized as a retrofit lubrication system for speed reducers, gear boxes or the like having no filtering means previously provided for in an original design. An adapter plate is mounted to the housing of the speed reducer, gearbox or the like proximal to a shaft which is supported in the gear box. A lubricant filter is mounted to an outer surface of the adapter plate, lubricant directing bores are provided that direct flow of lubricant from a lower portion of the gear box through the adapter plate and into the filter which is pumped from the filter back into the gear box.

9 Claims, 4 Drawing Sheets

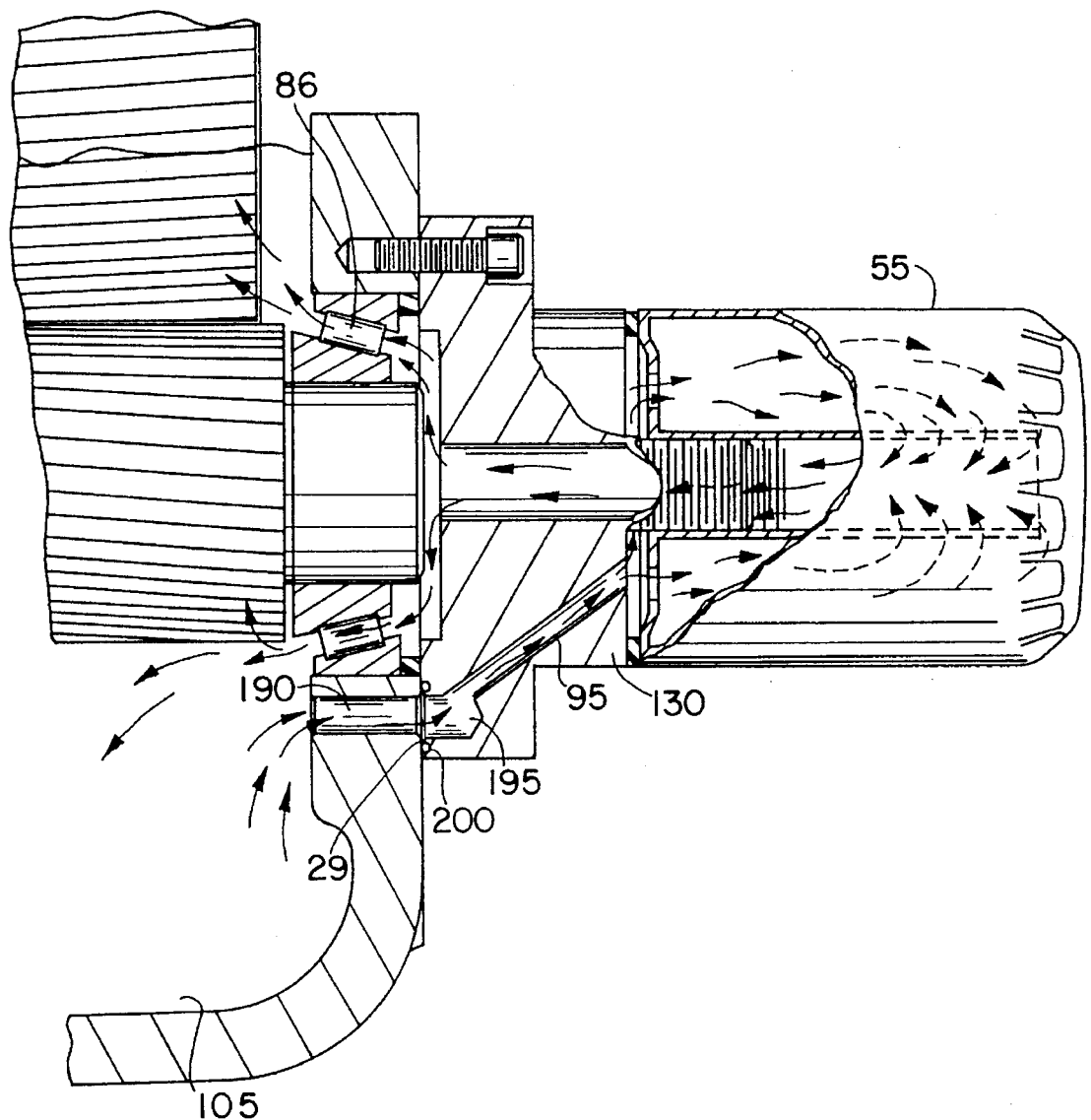
F I G. 4

LUBRICANT FILTERING SYSTEM

This is a continuation of application Ser. No. 08/052,064 filed Apr. 22, 1993, which was abandoned upon the filing hereof.

BACKGROUND OF THE INVENTION

The present invention relates to filter systems and more particularly to filter systems for filtering lubricant in a gear box or speed reducer.

Mechanical speed reducers are commonly used in industry to provide for proper shaft speed reduction between an electric motor or other prime mover and an output device such as a conveyer system. These mechanical reducers provide for increased shaft torque by mechanically reducing the shaft speed of the prime mover.

The speed reducer may be driven by a prime mover such as an electric motor through a belt drive direct connection or the like and may have either a single or double reduction ratio, although a multitude of reduction ratios can be provided for. The reducer may be utilized to drive output devices such as conveyers and the like in a variety of environments including, but not limited to, sand and gravel operations, food processing, feed and grain operations, chemical processing, mining, shipping, or aggregate conveyer systems.

Although the aforementioned systems are typically used for steady load conditions, moderate to heavy shock loads are frequently encountered during start up procedures or when high loads are placed on the output device over short periods of time. Therefore, momentarily, peak horsepower delivered to the mechanical reducer may be very high. Furthermore, these systems may be in continuous operation of over long periods with peak loads occurring at various times during operation.

Consequently, peak loads and prolonged use of the reducer contributes to the wear of components within the speed reducer. As a result, contamination may be generated within the sealed case of the mechanical reducer. Such contamination may be, for example, contamination in lubricant oil due to dirty environs, carbon being released from cast iron castings, and/or wear particles from gearing and bearings. Although the gear case will have lubricant such as gear oil within it, the presence of such wear debris or contamination limits the life of components within the casing of the mechanical speed reducer. Such contamination may damage roller bearings, pinions, gears, etc. within the mechanical reducer case.

SUMMARY TO THE INVENTION

The present invention recognizes and addresses the foregoing disadvantages, and others of prior art constructions and methods.

Accordingly, it is an object of the present invention to provide an improved filtering system for a gear reducer or the like.

It is another object of the present invention to provide a retrofit lubricant filtering system for use with speed reducers and the like.

It is another object of the present invention to provide an improved gearbox or speed reducer with a lubricant filtering mechanism.

It is a further object of the present invention to provide a filtering system for a gearbox or the like that does not necessitate use of an external pump.

These and other objects of the present invention are achieved by providing a speed reducer including at least one rotatable shaft supported by a bearing assembly, the reducer including a housing with a sump for containing a lubricant therein. The reducer comprises an adapter plate associated with the housing and in fluid communication therewith, a lubricant filter in fluid communication with the adapter plate and adapted to receive and filter lubricant from the sump. The reducer further comprises lubricant directing means for directing lubricant from the sump to the adapter plate and filter and back into the sump, and pumping means for pumping lubricant back through the lubricant directing means. The lubricant pumping means may be a tapered roller bearing assembly, wherein the tapered roller bearing assembly supports a shaft mounted in the casing proximal to the adapter plate.

These and other objects are also achieved by providing the lubrication system for a gear box or the like comprising an adapter plate adapted to be mounted to a housing of a gear box proximal to a shaft end supported in the gear box, the adapter plate having an inner surface proximal to the shaft. The lubrication system further includes a lubricant filter mounted to an outer surface of the adapter plate and lubricant directing means for directing lubricant from a portion of the gear box through the adapter plate and filter and back into the gear box, and pumping means for pumping lubricant through the lubricant directing means.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 4 illustrates a partial cut away view of the lubricant flow pattern within a second embodiment of the present invention.

Figure 1:
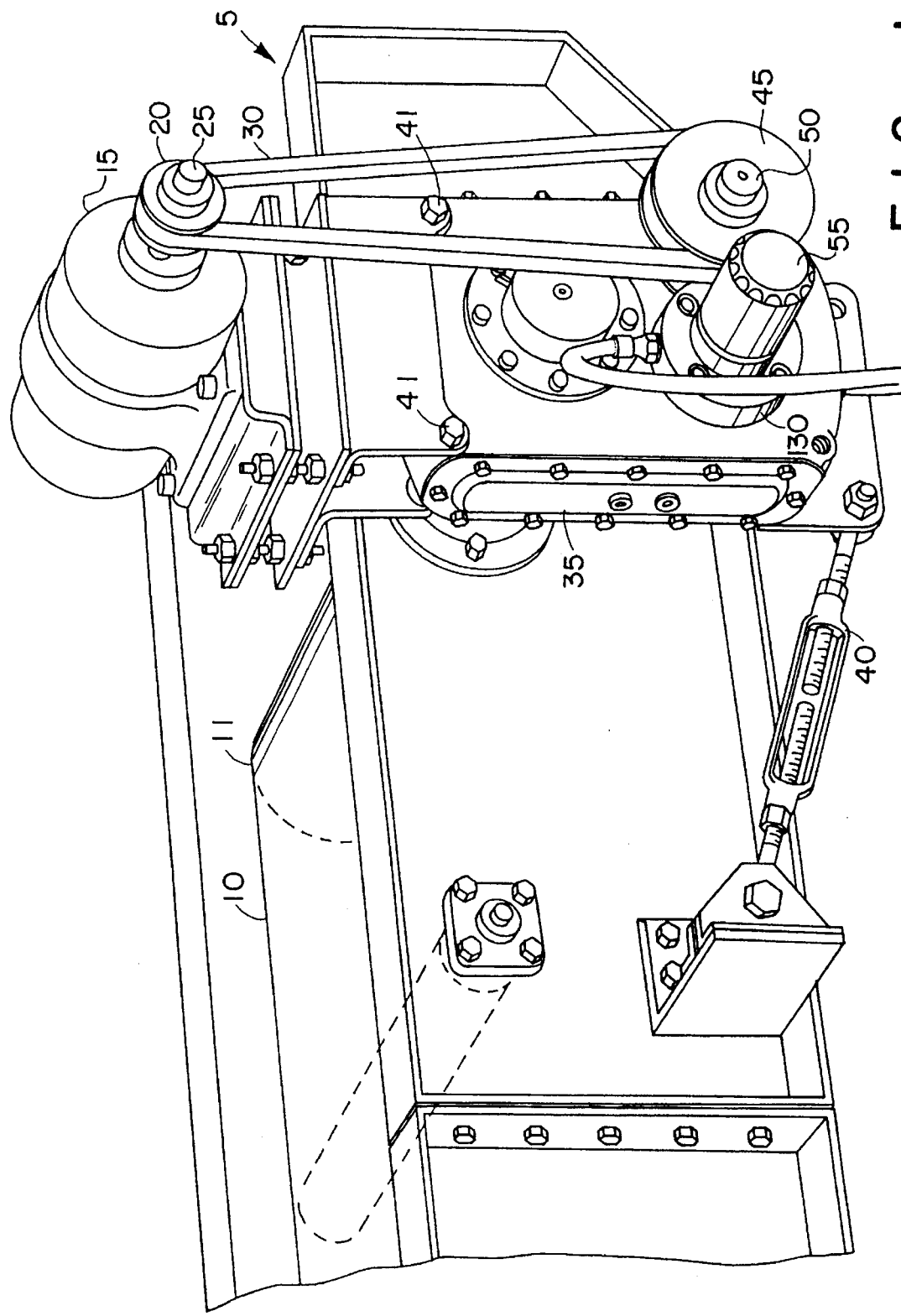
FIG. 1 illustrates a conveyer system which utilizes a mechanical reducer having a lubricant system according to an embodiment of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

Figure 2:
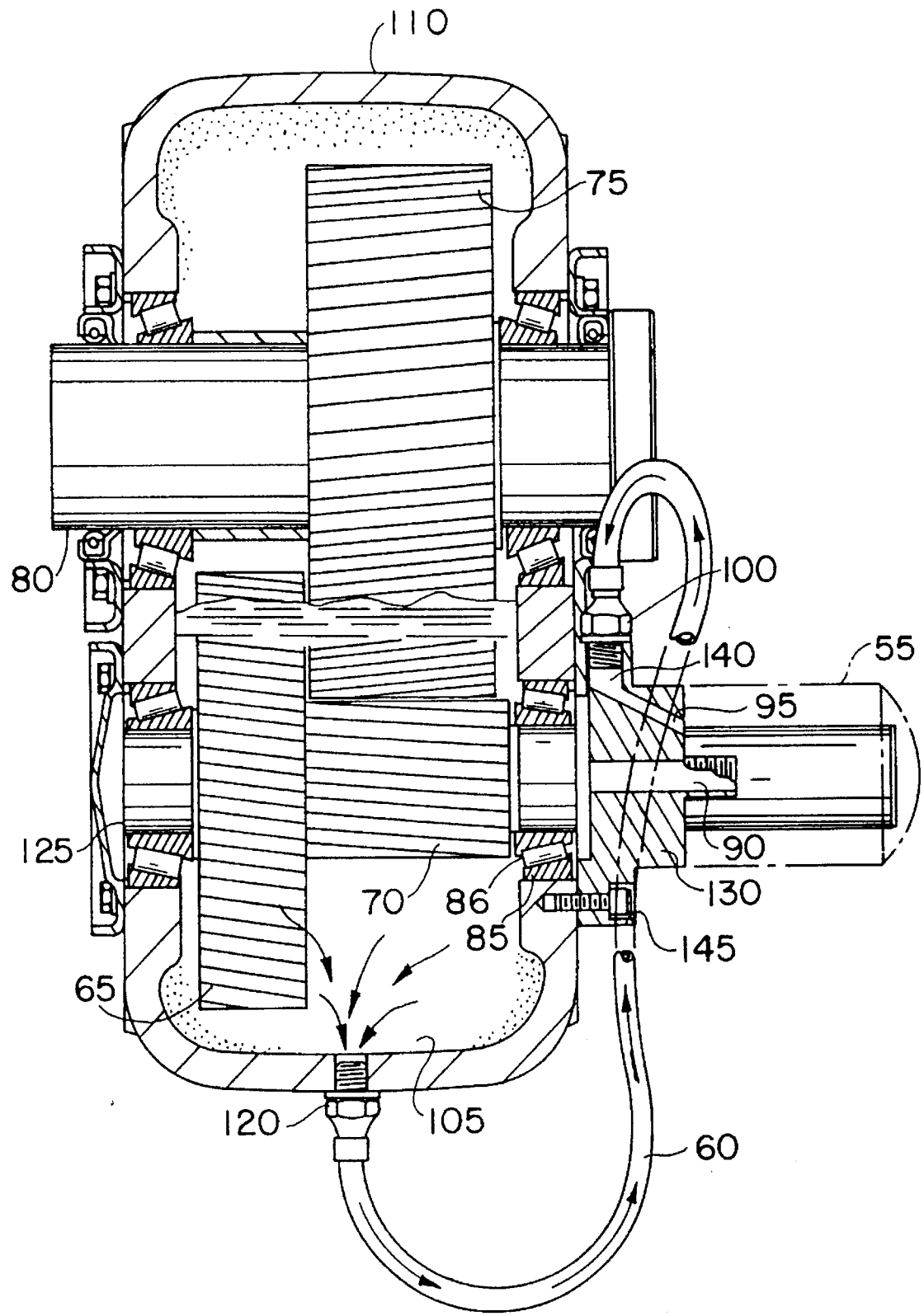
FIG. 2 illustrates a right side partial cut away view of the mechanical reducer with a lubricant system according to an embodiment of the present invention.

Referring to FIG. 1, a conveyer system utilizing an embodiment of the present invention is illustrated generally as 5. In general, conveyer system 5 includes conveyer belt 10 driven by roller 11. Roller 11 is mechanically coupled to the mechanical speed reducer 35 through output hub 80, as illustrated in FIG. 2. Mechanical reducer 35 is driven by a prime mover such as motor 15. In this illustrative embodiment, power is mechanically transferred from motor 15 to mechanical reducer 35 via motor pulley 20 mounted on motor shaft 25. Belt 30 drives input pulley 45 which is mounted on input shaft 50 of mechanical reducer 35. Torque arm 40 and bolts 41 secure mechanical reducer 35 in place during operation. Also illustrated generally in FIG. 1 is a lubrication system in accordance with an embodiment of the present invention. FIG. 1 illustrates an embodiment wherein lubricant feeding hose 60 feeds oil though adapter plate 130 into oil filter 55 as will be described in detail below.

FIG. 2 illustrates in more detail the lubrication system of an embodiment of the present invention. As best illustrated in FIGS. 1 and 2, input shaft 50 and its drive pinion (not shown) drive first reducing gear 65 on secondary shaft 125. Second drive pinion 70 drives output gear 75 which, in turn, imparts rotary motion to output shaft 80. The relative sizes of gears and pinions within the casing 110 allows for adequate speed reduction for proper conveyer operation, and selection for any particular operating parameters is well within the scope of one skilled in the art.

In general, the invention includes a lubrication system for filtering the lubricant in the gearbox, including an adapter plate 130 and a filter 55, operatively connected to the oil sump 105 of the gear reducer housing.

Lubricant directing means for filter 55 is illustrated in FIG. 2. A lubricant sump 105 is provided with a hose fitting 120 at its bottom which allows lubricant to flow through lubricant feeding hose 60. Hose fitting 120 may be placed in the housing wall 110 by drilling and tapping a hole in the sump 105 or by any other suitable means. Lubricant feeding hose 60 is operatively connected between hose fitting 120 and hose fitting 100 which connects to adapter plate 130. Hose fitting bore 140 in adapter plate 130 is adapted to accept hose fitting 100. Hose fitting bore 140 is operatively connected to transverse lubricant inlet bore 95. Transverse lubricant inlet bore 95 may be created by drilling or the like in adapter plate 130. Transverse lubricant inlet 95 allows lubricant to flow from lubricant feeding hose 60, through transverse bore 95 and through filter 55. Filtered lubricant exits through center outlet bore 90 in adapter plate 130.

FIG. 2 also illustrates a means for pumping lubricant through filter 55. Tapered roller bearing assembly 85 rotatably supports secondary shaft 125. Rotation of shaft 125 creates a centrifugal pumping action by tapered roller bearing assembly 85. The alignment of rollers 86 within tapered roller bearing assembly 85 serves to sling the filtered oil exiting from center outlet bore 90 both radially and axially toward second drive pinion 70. It has been found that the pumping action is adequate at about 300 rpm and up of the shaft associated with the tapered roller bearing assembly. It should be appreciated that in various environments, various speeds may be effectively utilized including below 300 rpm. Further, other bearing types in addition to tapered may also be effectively utilized. Adapter plate screws 145 hold adapter plate 130 against reducer housing wall 110. Of course, any suitable means of holding adapter plate 130 to housing wall 110 may be utilized.

Figure 3A:
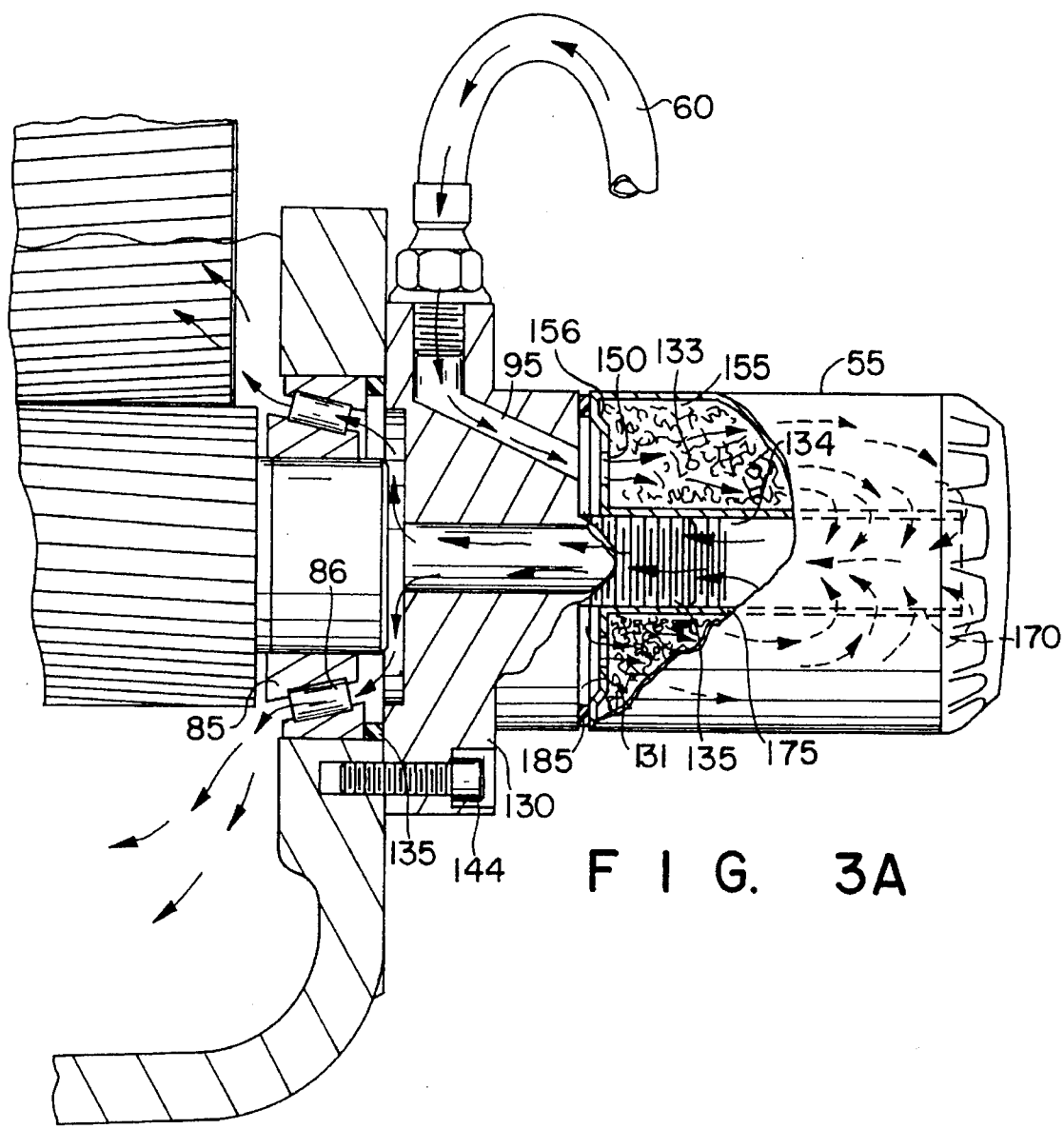
FIG. 3A illustrates a partial cut away view of the lubricant flow pattern within a first embodiment of the present invention.

FIG. 3A illustrates the embodiment of the lubrication system of FIG. 2 according to the present invention in greater detail. Adapter plate 130 may be mounted on the reducer by drilling and tapping holes 144 into reducer housing wall 110. As is illustrated by the arrows, lubricant flows from lubricant feeding hose 60, through transverse bore 95 to outer surface 131 of adapter plate 130.

A lubricant filter 55 is secured to adapter plate 130 via cylindrical filter mount. Mount has threads 133 on an outer surface thereof and filter 55 has threads 134 on an inner surface of lubricant filter wall 175 so that filter 55 is screwed on in the conventional manner used for most automotive oil filters.

Lubricant flows through perforations 150 in annular end-plate 156 of filter 55 and through filtering medium 155. Filter 55 can be a standard type automotive oil filter as is well known to one skilled in the art. Lubricant returns to the sump 105 through perforations 170 in filter inner wall 175 and to the pumping means though center outlet bore 90 within adapter plate 130. As embodied herein, the pumping means includes rollers 86 within tapered roller bearing assembly 85 which serve to pump lubricant out of filter 55 through the action of rollers 86.

An annular sealing member 135 is disposed between end wall 110 of the reducer housing and adapter plate 130 to seal the interface between the inner surface of adapter plate 130 and the outer surface of casing 110. Additionally, annular sealing means 185 is disposed between adapter plate 130 and filter 55 to prevent leakage between adapter plate 130 and filter 55.

Figure 3B:
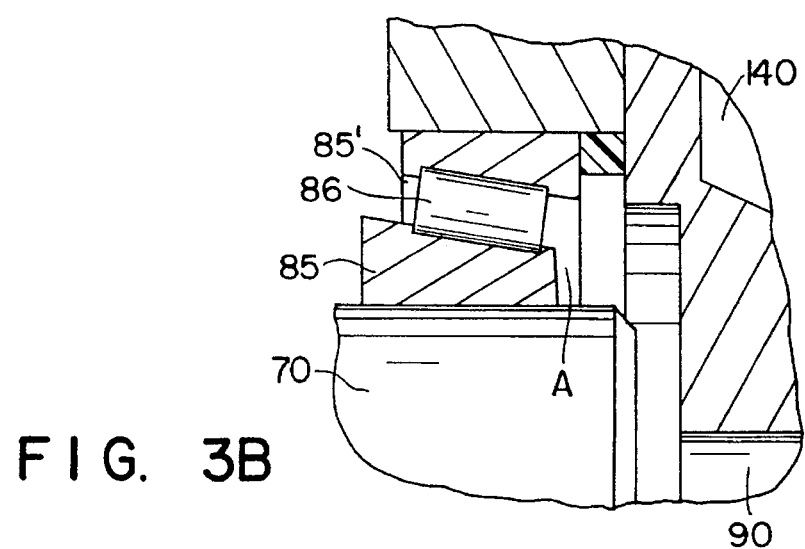
FIG. 3B illustrates a detailed view of the tapered bearing pumping arrangement.

FIG. 3B illustrates in greater detail the operation of the pumping means. When pinion 70 rotates in tapered bearing assembly 85, lubricant is slung by the movement of bearings 86 against sloped surface 85' causing the lubricant to be moved in the direction toward the sump (illustrated as left hand side of FIGS. 3A and 3B). This movement evacuates the area A behind the tapered bearing assembly causing suction that moves the lubricant through the filter system.

FIG. 4 illustrates another embodiment of the present invention. In the embodiment of FIG. 4, external lubricant feeding hose 60 is replaced with a return bore 190 in housing wall to allow communication between sump 105 and filter 55. Bore 195 is located in an inner surface of adapter plate 130 so that it is aligned with sump bore 190. Transverse bore 95 operatively connects an outer surface of adapter plate 130 to bore 195. As is illustrated by the flow arrows in FIG. 4, lubricant flows through sump bore 190, bore 195, transverse bore 95 and through filter 55 in the aforementioned manner. The centrifugal action of rollers 86 serves to pump lubricant out of filter 55 and back into the reducer housing wall. Annular sump bore seal 29 is seated in annular groove 200 in an inner surface of adapter plate 130 to prevent leakage between adapter plate 130 and housing wall 110.

It should be appreciated by those skilled in the art that the bores in the housing and adapter plate can be created in any known manner. Further, although oil is referred to as illustration, other lubricants could also be utilized. In addition, although the invention has particular applicability to gear reducers, its principles could be embodied in other devices with shafts without departing from the scope of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A speed reducer comprising:

a housing having a sump for containing a lubricant fluid, said housing including a sidewall having an opening therein;

at least one rotatable shaft mounted within said housing, said shaft having a free end defining an end face;

a bearing assembly mounted within the opening of said housing for supporting the free end of said shaft for rotation with respect to said housing, said bearing assembly including a first side facing axially toward an interior of said housing and being in direct fluid communication with said sump, and a second side facing exteriorly of said housing, wherein said bearing assembly is configured and arranged to pump fluid from said second side to said first side upon rotation thereof;

an adapter plate including opposed first and second mounting surfaces, wherein the first mounting surface of said adapter plate is mounted to the side wall of said housing to cover said opening, said adapter plate including an outlet passage therethrough including a first side on the first mounting surface and a second side on the second mounting surface, wherein the first side of said outlet passage is positioned adjacent the end face of said shaft, and wherein said adapter plate includes an inlet passage having a first side and a second side, wherein the second side of the said inlet passage is positioned on said second mounting surface;

lubricant directing means for directing lubricant between the first side of said inlet passage and said sump;

a lubricant filter including an inlet and an outlet; and means for mounting said lubricant filter to the second mounting surface of said adapter plate such that the second side of said inlet passage communicates with the inlet of said filter and the second side of the outlet passage communicates with the outlet of said filter;

whereby rotation of said shaft causes said bearing assembly to pump lubricant through said filter.

2. A speed reducer as set forth in claim 1, wherein said means for mounting includes a filter mount having an exteriorly threaded surface and extending from said second mounting surface thereof, said filter mount being concentric with said outlet passage.

3. A speed reducer as set forth in claim 2, wherein said filter is generally cylindrical in structure, said filter having inner and outer cylindrical walls, a perforated annular inner first end wall and a circular second end wall thereby defining an annular inner chamber, said annular inner chamber containing lubrication filtering medium, wherein said inner cylindrical wall includes an interiorly threaded surface proximal to said perforated annular inner first end wall that is threadedly attached to said exteriorly threaded surface of said filter mount, and wherein said inner cylindrical wall is perforate at an end proximal to said circular second end wall, such that the lubricant fluid may flow from said inlet passage in said adapter plate through said perforated annular inner first end wall of said filter, through said filtering medium through said perforations of said inner cylindrical wall and through said outlet passage and back into said housing.

4. A speed reducer as set forth in claim 3, wherein annular sealing means is disposed between said sidewall and said adapter plate.

5. A speed reducer as set forth in claim 1, wherein the first side of said inlet passage further includes a hose fitting bore defined in said adapter plate;

and wherein said lubricant directing means comprises a lubricant feeding hose extending from a basin portion of said housing adjacent said sump to said hose fitting bore such that said lubricant feeding hose feeds the lubricant fluid from said sump through said hose fitting bore and said inlet passage to said filter.

6. A speed reducer as set forth in claim 1, wherein said lubricant directing means further comprises a sump bore through the sidewall of said housing; and p1 Wherein said inlet passage includes a blind bore in said adapter plate extending from said first mounting surface proximal said sump bore and wherein said inlet passage includes a bore that extends from said second mounting surface in a generally oblique direction with respect to said outlet passage and terminates at said blind bore, such that said sump bore may direct the lubricant fluid through said housing, and said inlet passage to said filter.

7. A speed reducer as forth in claim 6, wherein sealing means is disposed around said sump bore between said sidewall and said adapter plate.

8. A speed reducer as set forth in claim 1, wherein said bearing assembly is a tapered roller bearing assembly.

9. A speed reducer as set forth in claim 8, wherein annular sealing means is disposed between an outer bearing race of said tapered roller bearing assembly and said first mounting surface of said adapter plate.

* * * * *

UNITED STATES PATENT AND TRADEMARK OFFICE
CERTIFICATE OF CORRECTION

PATENT NO. : 5,567,306
DATED : October 22, 1996
INVENTOR(S) : DeWachter

It is certified that error appears in the above-identified patent and that said Letters Patent is hereby corrected as shown below:

In column 6, line 9, delete "perforate" and insert therein --perforated--.

In column 6, line 29, delete "p1 Wherein" and insert therein --wherein--.

Signed and Sealed this

Eleventh Day of February, 1997

Attest:

BRUCE LEHMAN

Attesting Officer

Commissioner of Patents and Trademarks